United States Patent Office 2,810,774
Patented Oct. 22, 1957

2,810,774

POLYMERIZATION WITH BORON TRIFLUORIDE-PHOSPHORIC ACID CATALYST

George E. Serniuk, Roselle, N. J., assignor to Esso Research and Engineering Company, a corporation of Delaware No Drawing. Application August 20, 1952, Serial No. 305,515

4 Claims. (Cl. 260—683.15)

This invention relates to improved catalyst compositions comprising complexes of boron trifluoride and acids of phosphorus and to processes for making same. The invention also relates to processes for converting organic compounds employing the improved catalysts.

It is known to use coordination compounds of boron trifluoride and acids of phosphorus as catalysts for various hydrocarbon conversion reactions and the like, particularly for alkylating olefins with paraffins, polymerizing olefins, etc. These prior art compositions have been prepared by treating an acid or phosphorus with boron trifluoride at temperatures ranging from about 80° to 250° F. until the desired complex is formed, and then using the resulting viscous liquid as a catalyst. Typical art exemplifying such preparations includes British Patent 451,359 to Carpmael, accepted on August 4, 1936, and U. S. 2,404,897 to Axe issued July 30, 1946.

These prior art materials suffer a number of disadvantages. The compositions have poor storage stability characteristics, and, even on standing at atmospheric temperature, decompose to form an acidic gas and a precipitated solid. This decomposition impairs the activity of the composition and releases a highly corrosive substance deleterious to the usual storage containers. Furthermore, these catalysts have a relatively short life in various conversion operations, and are ill-suited for continuous operations. For example, at higher reaction temperatures, the catalyst activity declines rapidly, and, when the catalyst is supported on a solid, the bed rapidly becomes fouled with deposits and eventually plugs. It is the primary purpose of the present invention to teach an improved composition of the above type that overcomes the disadvantages of the prior art catalysts. A further object is to teach improved methods for applying these new compositions in processes for conversions of organic compounds.

In accordance with the present invention, an improved composition is obtained by combining an acid of phosphorus with boron trifluoride at a temperature below about 50° F., preferably at a temperature below 40° F. The resulting liquid complex is stable and may be stored for long periods of time at elevated temperatures without undergoing decomposition or dissociation. It is adaptable to continuous catalytic operations and is particularly suitable for use in conjunction for use in conjunction with a solid support, even at relatively high temperatures.

The coordination compounds prepared at a low temperature are somewhat different in composition to those previously known. It is not desired to be bound by any theory of reaction or mechanism whereby this class of compounds forms and decomposes, but it appears that the compounds formed at low temperatures have the following typical structure:

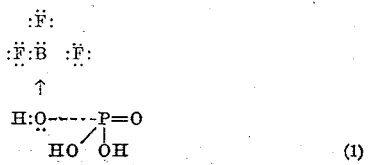

whereas compounds formed at higher temperatures undergo stepwise dissociation, during preparation and storage, and appear to release hydrogen fluoride until boron phosphate remains. Such a mechanism is illustrated as follows:

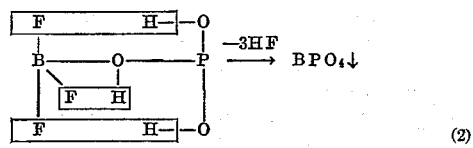

Although other reactions may take place, it appears that the complex prepared at the higher temperatures contains a mixture of degradation products in addition to the coordination compound.

The compositions of the present invention are quite acidic, and their relatively high hydrogen function leads to catalysts that are over-active for some reactions. In another aspect of the present invention, the activity of the complex catalyst is modified by maintaining free acid of phosphorus in the composition. The resulting composition is particularly attractive for controlling the molecular weight of polymers produced in polymerization of olefins.

In a further aspect of the present invention, the catalyst complex is employed in conversion operations in the presence of extraneous boron trifluoride. This method is particularly valuable in suppressing an excessive loss of $BF_3$ from the complex and thereby maintains maximum catalyst activity during long periods of continuous operations, or in operations at relatively high temperatures, since it assures the presence of an excess of boron trifluoride on the catalyst above that required for formation of the desired coordination compound. This type of catalyst has particular application in reactions involving less reactive compounds, such as the polymerization of propylene.

In still another aspect of the present invention, extraneous coordination catalyst in liquid form is added to the reaction zone containing the catalyst during the process. It has been found that a substantial induction period is required before the complex catalyst reaches its maximum activity with relatively unreactive compounds, even when extraneous boron trifluoride is maintained in the reaction zone. The continuous or intermittent addition of a small but effective amount of the liquid complex along with extraneous boron trifluoride gas reduces the induction period and also helps to maintain catalyst activity at a high level. This feature has particular application to processes using the catalyst supported on a solid, highly porous or relatively non-porous support.

It has also been found, and is a part of the present invention, that the catalyst complex, particularly when used on a solid support, may be pretreated with boron trifluoride to supply an excess thereof before being contacted with olefin to be polymerized. This pretreatment also effectively reduces the induction period required for obtaining maximum catalyst activity particularly in the polymerization of propylene.

The coordination compounds employed as catalysts in the present invention are readily prepared by treating an acid of phosphorus with sufficient boron trifluoride ($BF_3$) at a temperature below about 50° F. to form a complex containing the proper ratio of acid to $BF_3$. Generally, gaseous $BF_3$ is added to the liquid acid of phosphorus. Another convenient procedure for forming the complex, however, is to prepare first a complex of $BF_3$ and an organic aliphatic ether, such as dimethyl ether, diethyl ether, ethyl propyl ether and the like. The resulting liquid ether complex may then be added at a low temperature to the acid of phosphorus in the desired amount to;

form the coordination compound. The excess ether is subsequently removed by distillation under reduced pressure.

The temperature at which the acid of phosphorus and the BF₃ are combined is critical. It is generally preferred that the reaction mixture be kept below a temperature of 40° F. in order to minimize undesirable side reactions. The reaction of the BF₃ and acid is exothermic; therefore, provision should be made to remove heat of formation. This is made possible by combining the reactants in a reaction zone provided with cooling coils or a jacketed reactor with a cold medium circulating through the coils or jacket.

When using 100% acids, some difficulty may be encountered with crystallization at the low reaction temperatures. This difficulty may be avoided by adding some BF₃ at room temperature, for example, followed by chilling to the desired temperature before adding the major portion of the BF₃. However many acids of phosphorus may ordinarily be supercooled to below 40° to 50° F. without solidification difficulties.

The lower range of temperatures suitable for forming the complex will depend to some extent on the fluidity characteristics and reaction rates of the reactants. The reaction temperature should be sufficiently high to permit the reaction to proceed at a reasonable rate and to keep the materials fluid. Normally, temperatures as low as 20° F., or even lower, may be maintained. The resulting liquid complex will generally be fluid at temperatures as low as 0° F. or even lower. After the complex formation is finished, the complex may be used as catalyst immediately or may be heated to atmospheric temperature and stored.

The acids of phosphorus employed in making the coordination compound may be orthophosphoric acid, pyrophosphoric acid, metaphosphoric acid, hypophosphoric acid, phosphorous acid, meta phosphorous acid and various other acids of phosphorus, the phosphoric acids being preferred. The acid may be a single acid or a mixture of various acids.

While the acids are preferably 100% acids, they may contain some water. For example, phosphoric acid hemihydrate may be used or commercial syrupy phosphoric acid of 85 percent concentration. It is generally undesirable to employ large amounts of water which consumes boron trifluoride in side reactions. In some cases, however, the water in the acid forms a complex with the BF₃ as well as hydroxyfluoboric acids which are not considered objectionable. Sufficient BF₃ is usually employed to form a complex containing substantially equal molecular quantities of the acid and BF₃, although, in some cases, a molar ratio of phosphoric acid to BF₃ of 1:2 or higher may be used.

Typical coordination compounds include $H_3PO_4.BF_3$, $HPO_3.BF_3$, $H_4P_2O_7.BF_3$, $H_4P_2O_7.2BF_3$, and the like.

The acid component of the complex may be modified by incorporating a metal therein or in the composition. Thus, metal salts of free acids of phosphorus, such as salts of copper, iron, nickel, uranium, zinc, cobalt, manganese, silver, cadmium and chromium may be used in the preparation of the complex or may be added to the complex. The composition may also include metal oxides, sulfates and the like, such as those of titanium, zirconium, thorium, vanadium, etc. in small quantities.

The coordination compound may also be modified by the addition thereto of various amounts of boric anhydride, such as about 1 to 20% of the anhydride, based on the complex. Thus, at least some of the hydrogen fluoride released from the catalyst during use may react with the boric anhydride to regenerate BF₃, which in turn can recombine with free acid to reform the complex. This is a useful method for extending the life of the catalyst.

In the event it is desired to form a catalyst having free acid of phosphorus, the free acid may merely be added to the complex prepared by the above procedure in the desired ratio. This addition may be carried out at the reaction temperature for complex formation or at higher temperatures. Any suitable acid of phosphorus may be used. If the free acid is to be the same as the acid constituent of the complex, the composition is readily prepared in one step by adding insufficient BF₃ to the acid (at below 50° F.) to form a mixture of free acid and complex in any desired ratio. It is generally desirable to form mixtures in which the molar ratio of coordination compound to free acid of phosphorus is in the range of about 1:9 to 9:1. The mixture is generally a viscous liquid having many of the characteristics of the coordination compound.

The above complexes may be used in their liquid form as catalysts. For example, the material to be reacted may be passed through a pool of the catalyst. A preferred method, however, is to support the complex on a granular or finely divided solid. A film-type catalyst may be formed by introducing a thin film of the complex on nonporous, inert, solid particles such as quartz chips, pumice, copper turnings, sand and the like and contacting the resulting material with olefin or other reactant under suitable conditions.

In a preferred embodiment of the present invention, however, the liquid complex is supported on a solid adsorbent support to form a solid catalyst that may be used in continuous fixed bed, suspension or fluidized catalytic operations and the like in accordance with known prior art procedures. In preparing such a solid catalyst, the above-described coordination compound is mixed with finely divided porous solid in a desired ratio which will give the concentration of complex on the catalyst needed for the particular operation. Various adsorbent solids may be used. These include activated carbons derived from various sources; silicious and aluminum silicate adsorbents such as silica gel, kieselguhr, fuller's earth, clays, such as bentonite, and other diatomaceous earths. The finished solid catalyst may contain from as little as about 5% by weight, based on the total catalyst, of active coordination compound up to as high as 50 to 75% of the active catalyst ingredient. The solid material may be sized according to the particular needs. Thus, 4 to 10 mesh particles are generally suitable for fixed bed operations whereas smaller particles, such as in the range of 60 to 100 mesh or even finer, may be used in suspension and fluid-type operations.

It is generally only necessary to mix the solid adsorbent and liquid complex in the desired ratio until the adsorbent completely takes up the liquid complex. The finished supported catalyst is dry and free flowing and generally does not require subsequent drying and calcining operations at elevated temperatures. Addition of the liquid is facilitated by first subjecting the adsorbent to reduced pressure and then mixing it with the liquid complex at reduced pressure.

The catalysts of the present invention have particular application to the polymerization of olefins, such as the lower molecular weight olefinic hydrocarbons to form motor fuel blending agents, chemical intermediates, etc. The olefins include propylene, butylenes, pentenes and their mixtures. Ethylene generally undergoes very little reaction under the conditions employed, but it may be present as a component of the olefin feed stock. The catalyst may also be used with the higher molecular weight monoolefins such as heptenes, octenes, styrene, indene and the like. It may also be used for polymerizing diolefins such as butadiene, isoprene and other types of unsaturated aliphatic hydrocarbons. The feed may contain paraffinic diluents, inert gaseous diluents such as nitrogen, and the like. Olefin concentrations in the feed as low as about 20% or lower up to substantially 100% may be used.

Olefin polymerization may be carried out at a rather wide variety of reaction conditions. Reaction temperatures may range from well below room temperature up to as high as about 500° F. although the catalyst is more prone to decompose rapidly at the higher temperatures. Preferred temperatures range from about 70° to 300° F. Pressures may range from atmospheric up to as high as 1500 p. s. i. g., the higher pressures being especially desirable for retarding catalyst decomposition at relatively high reaction temperatures. Olefin feed rates, in terms of liquid volumes per volume of catalyst per hour, may range from about 0.1 to 10. The reaction conditions selected will obviously depend on such factors as the type of olefin feed employed, the relative activity of the catalyst and the like as will be apparent to one skilled in the art.

In carrying out a polymerization process with catalyst containing excess $BF_3$, it is merely necessary to maintain sufficient extraneous $BF_3$ in the reaction zone containing the catalyst to suppress inactivation of the catalyst complex and to keep the complex substantially completely saturated with $BF_3$. The amounts of $BF_3$ added to the reaction zone will usually not be critical as long as the above requirements are fulfilled. The $BF_3$ may be added in amounts as low as about 0.1 gaseous volume per volume of catalyst per hour (v./v./hr.) up to 30 or more v./v./hr. A preferred $BF_3$ feed rate is in the range of about 1 to 20 v./v./hr. under the usual polymerization conditions. The extraneous $BF_3$ may conveniently be added to the olefin feed charged to the reaction zone, or it may be added through a separate inlet or plurality of inlets into the zone. It is preferred that adequate distribution means be provided in the reaction zone in order to distribute the $BF_3$ to all parts of the catalyst. The $BF_3$ is preferably added continuously during the reaction, but intermittent addition may be effective in some cases.

In the event it is desired to pretreat the catalyst comprising either the liquid or solid complex, $BF_3$ is injected in the absence of olefin feed, into the zone containing the catalyst for a time sufficient to insure saturation of the catalyst and supporting material. The pretreating step may be carried out with gaseous $BF_3$ in amounts ranging from about 1 to 30 v./v./hr. at temperatures ranging from about room temperature up to 300° F. or higher. Treating times of from about 30 minutes up to 10 hours or so will generally be sufficient to reduce the induction period of the catalyst and form a catalyst of high initial polymerization activity.

The introduction of liquid $BF_3$ acid of phosphorus complex into the reaction zone during polymerization is readily accomplished by feeding it through an inlet at the top of the reaction zone and through a suitable distribution means to permit the complex to mix with or flow over the catalyst bed or to otherwise contact the catalyst and catalyst support during the polymerization step. Since the complex catalyst is substantially insoluble in the usual hydrocarbons, it is preferred not to introduce this material with the olefin feed. The amount of liquid complex added during polymerization is quite low. Amounts in the range of about 0.001 to 1 liquid v./v./hr. will generally suffice since the purpose of the addition of extraneous complex is to replace complex that may be removed from the zone as a result of reaction with hydrocarbon or that is removed by other means.

The practice of the present invention is demonstrated in connection with the following examples, which are presented without any intention of limiting the scope of the invention in any way.

EXAMPLE 1.—PREPARATION OF COMPLEX CATALYSTS (a) 100% $H_3PO_4$: The phosphoric acid required for the preparation of the catalyst of this example was obtained by adding phosphorus pentoxide to 85% phosphoric acid (39.5 g. $P_2O_5$/100 g. of 85% $H_3PO_4$) at a slow rate with stirring, the preparation being made in a 3-way round bottom flask fitted with a mechanical stirrer, reflux condenser, calcium chloride tube, and a mantle heater. When the required amount of $P_2O_5$ was added, the mixture was well stirred and heated at about 80° C. for 4 hours. The resulting mixture was 100% phosphoric acid.

(b) A portion of the above 100% $H_3PO_4$ was treated with gaseous $BF_3$ of 98 percent purity until equal molar quantities of acid and $BF_3$ had reacted. The temperature of the reactants was maintained at 140° to 150° F. during the entire reaction period. The walls of the glass reaction vessel were badly etched, apparently as a result of evolution of acidic gas believed to be hydrogen fluoride. A portion of liquid complex was then stored in a stoppered glass container at room temperature. It was noted that gas bubbles formed during storage and substantial vapor pressure developed in the container. After several weeks, a white precipitate formed and settled out of the liquid phase.

(c) A portion of the 100% $H_3PO_4$ of Example 1(a) was placed in a glass vessel which in turn was maintained in an ice bath. The acid was supercooled to 32° F. at which temperature it remained fluid. Gaseous $BF_3$ was then bubbled into the acid until equal molar quantities of acid and $BF_3$ had reacted. The mixture was maintained at 32° F. during the entire reaction period. The glass vessel was not etched and there was no evidence of HF evolution.

A portion of the resulting $H_3PO_4 \cdot BF_3$ complex was stored in a stoppered glass container at room temperature for about three months. No gas bubbles or solid precipitate formed during storage. Only a negligible vapor pressure developed during the storage period. There was no evidence of decomposition of the complex during the entire storage period.

EXAMPLE 2.—COMPARISON OF CATALYST ACTIVITY OF SUPPORTED COMPLEXES

Supported catalysts were prepared using complexes of both Examples 1(b) and 1(c). In each case, 70 g. of the complex was added at a slow rate to 200 ml. of conventional granular activated charcoal under partial vacuum at room temperature. The complex was readily adsorbed by the charcoal to form a free-flowing, dry-appearing composition.

Polymerization runs were carried out using the supported catalysts as a fixed bed. $C_3$–$C_4$ feed containing about 48% olefins was continuously passed through the beds at atmospheric pressure, temperatures ranging from 77° to 212° F. and liquid feed rates of about 0.5 to 1.0 volume per volume of catalyst per hour (liq. v./v./hr.).

When the composition containing the high temperature complex (Example 1(b)) was tested at a reaction temperature of 77° F. and 0.5 v./v./hr., an olefin conversion of 95% was obtained initially, but catalyst activity declined rapidly with time and olefin conversion dropped to 39% within 4 hours. Heavy deposits formed on the catalyst. These deposits were believed to be hydrocarbon-catalyst complex reaction products. When employing this same catalyst at a reaction temperature of 212° F., the initial olefin conversion was 94%, but deposits accumulated on the catalyst at a very rapid rate and the reactor plugged after 2 hours on stream. Plugging occurred even at a high feed rate of 1.0 liq. v./v./hr. with the catalyst consisting of about 20% complex-80% charcoal.

In operations with catalysts consisting of low temperature complex (Example 1(c)) and charcoal, the catalyst remained relatively free of deposits and decline of catalyst activity was less pronounced than in the above runs. For example, when using this catalyst at 212° F. and 0.5 liq. v./v./hr., an initial olefin conversion of 99% was obtained. After 4 hours, conversions of almost 50% were realized and there was no indication of plugging of the bed or of any further decline in the conversion level. Activity maintenance was considerably superior to that of the high temperature catalyst even when the latter was used at only 77° F. reaction temperature.

EXAMPLE 3.—EVALUATION OF MIXED COMPLEX-FREE ACID OF PHOSPHORUS CATALYSTS

Portions of the coordination compound of Example 1(c) were blended with 100% free phosphoric acid of Example 1(a) in molar ratios of 1:1 and 1:3, respectively. These mixtures and both the 100% phosphoric acid and the 100% $BF_3:H_3PO_4$ liquid complex of Example 1(c) were deposited on finely divided activated charcoal to form supported catalysts by the procedure of Example 2. The finished catalysts contained about 44 weight percent of the active catalytic ingredient supported on about 56 weight percent activated charcoal.

Fixed-bed polymerization runs were then carried out employing these supported catalysts. In each case, a substantially anhydrous $C_3$–$C_4$ hydrocarbon feed containing about 48% $C_3$–$C_4$ olefins was continuously passed through the catalyst bed at a feed rate of 0.5 liq. v./v./hr., a reaction temperature of 212° F., and atmospheric pressure for a time of 4 hours. The reactor was steam-jacketed for heat control purposes and had a length to diameter ratio of about 30:1. Each run was continued for a period of 4 hours. The results of these runs are shown in Table I below, presenting data on olefin conversion, polymer yield and product inspections:

Table I

| Complex/$H_3PO_4$ Mole Ratio | 0/100 | 1:1 | 3:1 | 100/0 |
|---|---|---|---|---|
| Olefin Conv., Mole Percent: Initial/Final | 30/20 | 49/35 | 92/42 | 99/46 |
| Average Conv., Mole Percent (4 hrs. cycle) | 21 | 40 | 58 | 70 |
| Polymer Yield, Wt. Percent | 14 | 24 | 41 | 58 |
| Selectivity to Liq. Prod., Wt. Percent | 62 | 66 | 71 | 84 |
| Product, I. B. P./F. B. P.[1], ° F | 205/330 | 205/380 | 210/400 | 205/460 |
| Vol. Percent Gasoline | 100 | 96 | 96 | 68 |
| Bromine No. of Gasoline, (cgs. Br/g.) | 156 | 150.7 | 130.8 | 109 |

[1] Initial boiling point/final boiling point.

It is noted that, under the conditions employed, the solid phosphoric acid catalyst gave relatively poor yields of product and high yields of gasoline in the product. On the other hand, the supported coordination compound catalyst had a superior activity but tended to produce higher molecular weight polymers. The supported catalysts of the present invention, containing free phosphoric acid, maintained high catalyst activity and produced a higher yield of gasoline than would be expected from the yields obtainable from either of the 100% catalysts.

EXAMPLE 4.—POLYMERIZATION OF PROPYLENE (a) A fixed-bed polymerization run was carried out employing a supported complex catalyst consisting of 37 weight percent of the low temperature complex of Example 1(c) on 63 weight percent activated charcoal. A substantially anhydrous $C_3$ hydrocarbon feed containing 95% propylene was continuously passed through the catalyst bed at a feed rate of 0.5 liq. v./v./hr., at a reaction temperature of 212° F., and at atmospheric pressure.

The run was continued for a period of three hours during which substantially no conversion of olefin to polymer was obtained. Only a few drops of polymer were collected during the three-hour period, and the run was discontinued.

(b) A run was also carried out in which a mixture of $BF_3$ gas and the above $C_3$ feed containing moisture was passed through a tube reactor at atmospheric pressure and about 212° F. Substantially no polymerization of olefins was realized.

It is seen that propylene is difficult to polymerize under the conditions employed when using either the coordination compound or $BF_3$ as catalyst.

EXAMPLE 5.—EFFECT OF ADDITION OF EXTRANEOUS $BF_3$ DURING POLYMERIZATION

A run was carried out under the conditions described in Example 4(a) except that extraneous $BF_3$ gas was added with the $C_3$ feed during the run. The $BF_3$ rate was 9.5 gaseous v./v./hr. The results are shown in Table II below:

Table II

| Reaction Time, Hours | 1.0 | 1.5 | 2.0 | 2.5 |
|---|---|---|---|---|
| Polymer Yield, Wt. Percent | 1.0 | 55 | 66 | 92 |
| Polymer Boiling Range, ° F.: Initial/Final | | 165/525 | 221/576 | 192/592 |
| Product Distribution, Approx. Vol. Percent: | | | | |
| $C_9$ | | 12 | 3 | 6 |
| $C_{12}$ | | 42 | 22 | 14 |
| $C_{15}$ | | 46 | 55 | 48 |
| $C_{18}$ | | 0 | 20 | 32 |
| Bromine No. of Distillate, cgs. Br/g. | | 91 | 84 | 82 |

It is seen that an induction period of over one hour was required before substantial yields of polymer were obtained. After about two hours, the polymer yield increased to 92 percent, based on the feed, which is equivalent to substantially complete conversion of the olefins in the feed.

EXAMPLE 6.—EFFECT OF ADDITION OF BOTH CATALYST COMPLEX AND EXTRANEOUS $BF_3$ DURING POLYMERIZATION OF PROPYLENE

This run was carried out under the conditions described in Example 4(a) except that reaction temperatures were varied in the range of 212°–273° F. Provision was made at the top of the reactor to inject liquid $H_3PO_4:BF_3$ complex catalyst onto the catalyst bed at a continuous flow rate of 0.025 liquid v./v./hr. The liquid complex was prepared as described in Example 1(c). Gaseous $BF_3$ was also continuously introduced with the $C_3$ feed into the reactor as in Example 5. The results of this run are shown in Table III, below:

Table III

| Reaction Time, Hours | 1.0 | 1.5 | 2.0 | 2.5 |
|---|---|---|---|---|
| Polymer Yield, Wt. Percent | 46 | 97 | 81 | 91 |
| Polymer Boiling Range, ° F.: Initial/Final | 214/482 | 172/536 | 144/536 | 144/590 |
| Product Distribution, Approx. Vol. Percent: | | | | |
| $C_9$ | 17 | 11 | 10 | 13 |
| $C_{12}$ | 34 | 19 | 14 | 9 |
| $C_{15}$ | 33 | 42 | 38 | 23 |
| $C_{18}$ | 10 | 16 | 25 | 40 |
| $C_{18+}$ | | 8 | 11 | 13 |
| Bromine No. of Distillate, cgs. Br/g. | 85 | 75 | 70 | 60 |

The induction period required to obtain high polymer yields was considerably shorter than that required in the run of Example 5, and substantial yields of polymer were obtained during the first hour of operation.

EXAMPLE 7.—EFFECT OF PRETREATING COMPLEX CATALYST WITH $BF_3$

In this run, a portion of the supported complex catalyst of Example 4(a) was placed in the reactor and pretreated with $BF_3$ gas at a rate of 9.5 gaseous v./v./hr. for five hours at a temperature of 212° F. to saturate the support. A polymerization run using a propylene feed was then conducted using the conditions of Example 4(a), no extraneous $BF_3$ being maintained in the reaction zone. The results of this run are shown in Table IV, below:

Table IV

| Reaction Time, Hours | 0.5 | 1.0 | 3.0 |
|---|---|---|---|
| Polymer Yield, wt. percent | 21 | 28 | 16 |
| Polymer Boiling Range, °F.: Initial/Final | 86/180 | 101/240 | 107/180 |
| Bromine No. of Distillate, cg. Br/g | 48 | 75 | 64 |

The pretreated catalyst showed a high initial activity in contrast to that of either the untreated catalyst (Example 4(a)) or the untreated catalyst used with extraneous $BF_3$ (Example 5). However, the catalyst did not reach a high level of activity, and activity dropped after about one hour. While pretreatment with $BF_3$ is effective for reducing the induction period required for reaching maximum catalyst activity, the introduction of extraneous $BF_3$ and/or catalyst complex into the catalyst zone is needed in order to reach and maintain maximum catalyst activity.

While the catalyst of the present invention has been illustrated particularly in connection with polymerization operations, it may also be used for other conversion operations such as alkylation of olefins, aromatics, phenols and the like with paraffins, isomerization of various hydrocarbons, etc.

The catalyst may be used in liquid or supported form by means well known to the art for conducting such operations with related catalysts.

What is claimed is:

1. An improved process for the manufacture of polymer gasoline which comprises adding boron trifluoride to liquid phosphoric acid of about 85 to 100% concentration at a temperature below about 50° F. until said acid has reacted with a substantially equal molar quantity of boron trifluoride to form a liquid complex, passing said complex to a polymerization zone, introducing $C_3$—$C_4$ olefins in contact with said complex under polymerization conditions, and recovering from said polymerization zone a hydrocarbon fraction boiling in the gasoline boiling range.

2. A process as defined by claim 1 wherein said complex is dispersed upon an inert supporting material prior to being passed to said polymerization zone.

3. A process as defined by claim 2 wherein said dispersed complex is treated with boron trifluoride prior to being passed to said polymerization zone.

4. A process as defined by claim 2 wherein additional liquid complex is introduced into said polymerization zone during the contacting of said olefins and said complex.

References Cited in the file of this patent

UNITED STATES PATENTS

| | | |
|---|---|---|
| 2,378,040 | Schulze | June 12, 1945 |
| 2,404,897 | Axe | July 30, 1946 |
| 2,469,335 | Johnson et al. | May 3, 1949 |
| 2,494,510 | Hughes et al. | Jan. 10, 1950 |
| 2,588,358 | Carlson et al. | May 11, 1952 |

OTHER REFERENCES

Topchiev et al.: I. Chemical Abstracts, vol. 43 (1949), pages 1214h–1215f (abstracted from Zhur. Obshchei Khim, vol. 18 (1948), pages 1537–44).

Topchiev et al.: II. Chemical Abstracts, vol. 46 (1952), pages 2476g–2477h (abstracted from Doklady Okad. Nauk. S. S. S. R. (1951), pages 381–4).